United States Patent
Nanda et al.

(10) Patent No.: US 7,755,525 B2
(45) Date of Patent: Jul. 13, 2010

(54) DELTA SIGMA MODULATOR WITH UNAVAILABLE OUTPUT VALUES

(75) Inventors: Kartik Nanda, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 99 days.

(21) Appl. No.: 12/241,940

(22) Filed: Sep. 30, 2008

(65) Prior Publication Data

US 2009/0191837 A1    Jul. 30, 2009

Related U.S. Application Data

(60) Provisional application No. 61/024,582, filed on Jan. 30, 2008.

(51) Int. Cl.
*H03M 3/00* (2006.01)
(52) U.S. Cl. .......................... 341/143; 341/155
(58) Field of Classification Search ................. 341/143, 341/155, 138
See application file for complete search history.

(56) References Cited

U.S. PATENT DOCUMENTS

| | | |
|---|---|---|
| 3,790,878 A | 2/1974 | Brokaw |
| 3,881,167 A | 4/1975 | Pelton et al |
| 4,075,701 A | 2/1978 | Hofmann |
| 4,334,250 A | 6/1982 | Theus |
| 4,414,493 A | 11/1983 | Henrich |
| 4,476,706 A | 10/1984 | Hadden et al. |
| 4,677,366 A | 6/1987 | Wilkinson et al. |
| 4,683,529 A | 7/1987 | Bucher |
| 4,700,188 A | 10/1987 | James |
| 4,797,633 A | 1/1989 | Humphrey |
| 4,940,929 A | 7/1990 | Williams |

(Continued)

FOREIGN PATENT DOCUMENTS

EP    0585789 A1    3/1994

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner*—Jean B Jeanglaude
(74) *Attorney, Agent, or Firm*—Hamilton & Terrile, LLP; Kent B. Chambers

(57) ABSTRACT

A power control system includes a delta sigma modulator to generate output values for use in controlling a switching power converter. In at least one embodiment, the delta sigma modulator includes two ranges of available output values and a range of one or more unavailable intermediate output values, wherein the range of one or more unavailable intermediate output values represent a gap in available output values. Each unavailable intermediate output value represents an output value that is not generated by the delta sigma modulator. In at least one embodiment, the delta sigma modulator includes a quantizer output remapping module that remaps quantizer output values within the range of one or more unavailable intermediate output values of the delta sigma modulator to new output values within one of the ranges of available output values.

25 Claims, 7 Drawing Sheets

U.S. PATENT DOCUMENTS

| | | | |
|---|---|---|---|
| 4,973,919 A | 11/1990 | Allfather |
| 4,979,087 A | 12/1990 | Sellwood et al. |
| 4,992,919 A | 2/1991 | Lee et al. |
| 4,994,952 A | 2/1991 | Silva et al. |
| 5,206,540 A | 4/1993 | de Sa e Silva et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,477,481 A | 12/1995 | Kerth |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,781,040 A | 7/1998 | Myers |
| 5,783,909 A | 7/1998 | Hochstein |
| 5,900,683 A | 5/1999 | Rinehart et al. |
| 5,929,400 A | 7/1999 | Colby et al. |
| 5,946,202 A | 8/1999 | Balogh |
| 5,952,849 A | 9/1999 | Haigh et al. |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,150,774 A | 11/2000 | Mueller et al. |
| 6,211,626 B1 | 4/2001 | Lys et al. |
| 6,211,627 B1 | 4/2001 | Callahan |
| 6,229,271 B1 | 5/2001 | Liu |
| 6,246,183 B1 | 6/2001 | Buonavita |
| 6,259,614 B1 | 7/2001 | Ribarich et al. |
| 6,304,066 B1 | 10/2001 | Wilcox et al. |
| 6,304,473 B1 | 10/2001 | Telefus et al. |
| 6,344,811 B1 | 2/2002 | Melanson |
| 6,385,063 B1 | 5/2002 | Sadek et al. |
| 6,407,691 B1 | 6/2002 | Yu |
| 6,445,600 B2 | 9/2002 | Ben-Yaakov |
| 6,509,913 B2 | 1/2003 | Martin, Jr. et al. |
| 6,580,258 B2 | 6/2003 | Wilcox et al. |
| 6,583,550 B2 | 6/2003 | Iwasa et al. |
| 6,636,003 B2 | 10/2003 | Rahm et al. |
| 6,713,974 B2 | 3/2004 | Patchornik et al. |
| 6,727,832 B1 * | 4/2004 | Melanson .................. 341/143 |
| 6,741,123 B1 | 5/2004 | Andersen et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 7,003,023 B2 | 2/2006 | Krone et al. |
| 7,050,509 B2 | 5/2006 | Krone et al. |
| 7,064,498 B2 | 6/2006 | Dowling et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,102,902 B1 | 9/2006 | Brown et al. |
| 7,106,603 B1 | 9/2006 | Lin et al. |
| 7,109,791 B1 | 9/2006 | Epperson et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shytenberg et al. |
| 7,183,957 B1 | 2/2007 | Melanson |
| 7,221,130 B2 | 5/2007 | Ribeiro et al. |
| 7,233,135 B2 | 6/2007 | Noma et al. |
| 7,255,457 B2 | 8/2007 | Ducharme et al. |
| 7,266,001 B1 | 9/2007 | Notohamiprodjo et al. |
| 7,288,902 B1 | 10/2007 | Melanson |
| 7,292,013 B1 | 11/2007 | Chen et al. |
| 7,310,244 B2 | 12/2007 | Yang et al. |
| 7,545,130 B2 | 6/2009 | Latham |
| 7,554,473 B2 * | 6/2009 | Melanson .................. 341/143 |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0223255 A1 | 12/2003 | Ben-Yaakov |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0184895 A1 | 8/2005 | Petersen et al. |
| 2005/0218838 A1 | 10/2005 | Lys |
| 2005/0253533 A1 | 11/2005 | Lys et al. |
| 2005/0275354 A1 | 12/2005 | Hausman, Jr. et al. |
| 2006/0022916 A1 | 2/2006 | Aiello |
| 2006/0023002 A1 | 2/2006 | Hara et al. |
| 2006/0125420 A1 | 6/2006 | Boone et al. |
| 2006/0226795 A1 | 10/2006 | Walter et al. |
| 2006/0261754 A1 | 11/2006 | Lee |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0103949 A1 | 5/2007 | Tsuruya |
| 2007/0182699 A1 | 8/2007 | Ha et al. |
| 2008/0174372 A1 | 7/2008 | Tucker et al. |
| 2008/0192509 A1 | 8/2008 | Dhuyvetter et al. |
| 2008/0224635 A1 | 9/2008 | Hayes |
| 2008/0259655 A1 | 10/2008 | Wei et al. |
| 2008/0278132 A1 | 11/2008 | Kesterson et al. |
| 2009/0147544 A1 | 6/2009 | Melanson |

FOREIGN PATENT DOCUMENTS

| | | |
|---|---|---|
| EP | 1014563 | 6/2000 |
| EP | 1164819 A | 12/2001 |
| EP | 1213823 A2 | 6/2002 |
| EP | 1528785 A | 5/2005 |
| JP | WO 2006/0022107 A2 | 3/2006 |
| WO | 01/97384 A | 12/2001 |
| WO | WO0227944 | 4/2002 |
| WO | 02/091805 A2 | 11/2002 |
| WO | 2006/067521 A | 6/2006 |
| WO | WO2006135584 | 12/2006 |
| WO | 2007/026170 A | 3/2007 |
| WO | 2007/079362 A | 7/2007 |

OTHER PUBLICATIONS

Yu, Zhenyu, 3.3V DSP for Digital Motor Control, Texas Instruments, Application Report SPRA550 dated Jun. 1999.

International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits"[Online] 2001, Texas Instruments, Inc. SEM-1400, Unitrode Power Supply Design Seminar, Topic II, TI literature No. SLUP133, XP002552367, Retrieved from the Internet: URL:htt/://focus.ti.com/lit/ml/slup169/slup169.pdf the whole document.
"HV9931 Unity Power Factor LED Lamp Driver, Initial Release" 2005, Supertex Inc., Sunnyvale, CA USA.
AN-H52 Application Note: "HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscataway, NJ USA, IEEE, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.

Prodic, A. et al, "Dead Zone Digital Controller for Improved Dynamic Response of Power Factor Preregulators," IEEE, 2003.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, 150130, "High IMR, Low Cost Isolation Amplifier," SBOS220, US, Oct. 2001.
International Search Report and Written Report PCT US20080062428 dated Feb. 5, 2008.
"HV9931 Unity Power Factor LED Lamp Driver, Initial Release", Supertex Inc., Sunnyvale, CA USA 2005.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscataway, NJ, USA, IEEE, pp. 1494-1499.
Written Opinion of the International Searching Authority PCT/US2008/056739 dated Dec. 3, 2008.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
INFINEON, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.

Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEETransactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, Vol. 17, No. 2, Mar. 2006.
O. Garcia et al., High Efficiency PFC Converter to Meet EN61000-3-2 AND A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp: III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, on Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf/com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family, IQ Switch®—ProxSense™ Series, Touch Sensor, Load Control and User Interface, IQS17 Datasheet V2.00.doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Compliant 500W Dimmer with Low-Losses Symmetrical Switches, 2005 European Conference on Power Electronics and Applications, Sep. 2005.

Why Different Dimming Ranges? The Difference Between Measured and Perceived Light, 2000 http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

Y. Ji et al., Compatibility Testing of Fluorescent Lamp and Ballast Systems, IEEE Transactions on Industry Applications, vol. 35, No. 6, Nov./Dec. 1999.

National Lighting Product Information Program, Specifier Reports, "Dimming Electronic Ballasts," vol. 7, No. 3, Oct. 1999.

Supertex Inc., Buck-based LED Drivers Using the HV9910B, Application Note AN-H48, Dec. 28, 2007.

D. Rand et al., Issues, Models and Solutions for Triac Modulated Phase Dimming of LED Lamps, Power Electronics Specialists Conference, 2007.

Supertex Inc., HV9931 Unity Power Factor LED Lamp Driver, Application Note AN-H52, Mar. 7, 2007.

Supertex Inc., 56W Off-line LED Driver, 120VAC with PFC, 160V, 350mA Load, Dimmer Switch Compatible, DN-H05, Feb. 2007.

ST Microelectronics, Power Factor Corrector L6561, Jun. 2004.

Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F800/E, Jul. 2005.

International Search Report for PCT/US2008/051072, mailed Jun. 4, 2008.

* cited by examiner

```
// Compute T1 Switch 211 (Figure 2) "ON" time for nonlinear Delta Sigma
Modulator 502 (Figure 5) (DeltaSigma with sqrt quantizer) // t1_sqr_desired = t1_sqr_const*pow(tt,2)*(vc-vx_meas)+p_util;
if      (t1_sqr_err + t1_sqr_desired - pow(t1,2)> 3*t1 + 2)   t1 = t1 + 2;
else if (t1_sqr_err + t1_sqr_desired - pow(t1,2)>       t1 )  t1 = t1 + 1;
else if (t1_sqr_err + t1_sqr_desired - pow(t1,2)< -3*t1 +2)   t1 = t1 - 2;
else if (t1_sqr_err + t1_sqr_desired - pow(t1,2)<      -t1 )  t1 = t1 - 1;
if (t1 == 2)  t1 = 5;
if (t1 < 5)   t1 = 0;
t1_sqr_err = min(127, max(-128, t1_sqr_err + t1_sqr_desired - t1*t1));
```

*Figure 7* ies, Vol. 22, No. 5, Sep. 2007, pp. 1719-1729 (referred to
DELTA SIGMA MODULATOR WITH UNAVAILABLE OUTPUT VALUES

CROSS-REFERENCE TO RELATED APPLICATION

This application claims the benefit under 35 U.S.C. §119 (e) and 37 C.F.R. §1.78 of U.S. Provisional Application No. 61/024,582, filed Jan. 30, 2008 and entitled "Delta Sigma with Restricted Outputs." Provisional Application No. 61/024,582 includes exemplary systems and methods and is incorporated by reference in its entirety.

BACKGROUND OF THE INVENTION

1. Field of the Invention

The present invention relates in general to the field of signal processing, and more specifically to a power control system and method using a delta sigma modulator with unavailable intermediate output values.

2. Description of the Related Art

Power control systems often utilize a switching power converter to convert alternating current (AC) voltages to direct current (DC) voltages or DC-to-DC. Switching power converters often include a nonlinear energy transfer process to provide power factor corrected energy to a load. Power control systems often provide power factor corrected and regulated output voltages to many devices that utilize a regulated output voltage.

FIG. 1 represents a power control system 100, which includes a switching power converter 102. Voltage source 101 supplies an AC input voltage $V_{in}$ to a full bridge diode rectifier 103. The voltage source 101 is, for example, a public utility, and the input voltage $V_{in}$ is, for example, a 60 Hz/110 V line voltage in the United States of America or a 50 Hz/220 V line voltage in Europe. The rectifier 103 rectifies the input voltage $V_{in}$ and supplies a rectified, time-varying, line input voltage $V_X$ to the switching power converter 102.

The power control system 100 includes a PFC and output voltage controller 114 to control power factor correction and regulate an output voltage $V_C$ of switching power converter 102. The PFC and output voltage controller 114 controls an ON (i.e. conductive) and OFF (i.e. nonconductive) state of switch 108 by varying a state of pulse width modulated control signal $CS_0$. Switching between states of switch 108 regulates the transfer of energy from the rectified line input voltage $V_X$ through inductor 110 to capacitor 106. The inductor current $i_L$ ramps 'up' when the switch 108 is ON. The inductor current $i_L$ ramps down when switch 108 is OFF and supplies current $i_L$ to recharge capacitor 106. The time period during which inductor current $i_L$ ramps down is commonly referred to as the "inductor flyback time". During the inductor flyback time, diode 111 is forward biased. Diode 111 prevents reverse current flow into inductor 110 when switch 108 is OFF. In at least one embodiment, the switching power converter 102 operates in discontinuous current mode, i.e. the inductor current $i_L$ ramp up time plus the inductor flyback time is less than the period of the control signal $CS_0$, which controls the conductivity of switch 108. When operating in continuous conduction mode, the inductor current $i_L$ ramp-up time plus the inductor flyback time equals the period of control signal $CS_0$.

Inductor current $i_L$ is proportionate to the 'on-time' of switch 108, and the energy transferred to inductor 110 is proportionate to the 'on-time' squared. Thus, the energy transfer process is one embodiment of a nonlinear process. In at least one embodiment, control signal $CS_0$ is a pulse width modulated signal, and the switch 108 is a field effect transistor (FET), such as an n-channel FET. Control signal $CS_0$ is a gate voltage of switch 108, and switch 108 conducts when the pulse width of $CS_0$ is high. Thus, the 'on-time' of switch 108 is determined by the pulse width of control signal $CS_0$. Accordingly, the energy transferred to inductor 110 is proportionate to a square of the pulse width of control signal $CS_0$.

Capacitor 106 supplies stored energy to load 112. The capacitor 106 is sufficiently large so as to maintain a substantially constant output voltage $V_C$, as established by PFC and output voltage controller 114. The output voltage $V_C$ remains substantially constant during constant load conditions. However, as load conditions change, the output voltage $V_C$ changes. The PFC and output voltage controller 114 responds to the changes in $V_C$ and adjusts the control signal $CS_0$ to restore a substantially constant output voltage $V_C$ as quickly as possible. The switching power converter 102 includes a small capacitor 115 to filter any high frequency signals from the input voltage $V_X$.

The goal of power factor correction technology is to make the switching power converter 102 appear resistive to the voltage source 101. Thus, PFC and output voltage controller 114 attempts to control the inductor current $i_L$ so that the average inductor current $i_L$ is linearly and directly related to the line input voltage $V_X$. Prodić, *Compensator Design and Stability Assessment for Fast Voltage Loops of Power Factor Correction Rectifiers*, IEEE Transactions on Power Electronics, Vol. 22, No. 5, Sep. 2007, pp. 1719-1729 (referred to herein as "Prodić"), describes an example of PFC and output voltage controller 114.

In at least one embodiment, the values of the pulse width and duty cycle of control signal $CS_o$ depend on sensing two signals, namely, the input voltage $V_X$ and the capacitor voltage/output voltage $V_C$. PFC and output voltage controller 114 receives the two voltage signals, the input voltage $V_X$ and the output voltage $V_C$, via a wide bandwidth current loop 116 and a slower voltage loop 118. The input voltage $V_X$ is sensed from node 120 between the diode rectifier 103 and inductor 110. The output voltage $V_C$ is sensed from node 122 between diode 111 and load 112. The current loop 116 operates at a frequency $f_c$ that is sufficient to allow the PFC and output voltage controller 114 to respond to changes in the line input voltage $V_X$ and cause the inductor current $i_L$ to track the input voltage $V_X$ to provide power factor correction. The current loop frequency is generally set to a value between 20 kHz and 130 kHz. The voltage loop 118 operates at a much slower frequency $f_v$, typically 10-20 Hz. By operating at 10-20 Hz, the voltage loop 118 functions as a low pass filter to filter an AC ripple component of the output voltage $V_C$.

The PFC and output voltage controller 114 controls the pulse width (PW) and period (TT) of control signal $CS_0$. Thus, PFC and output voltage controller 114 controls the nonlinear process of switching power converter 102 so that a desired amount of energy is transferred to capacitor 106. The desired amount of energy depends upon the voltage and current requirements of load 112. To regulate the amount of energy transferred and maintain a power factor close to one, PFC and output voltage controller 114 varies the period TT of control signal $CS_0$ so that the input current $i_L$ tracks the changes in input voltage $V_X$ and holds the output voltage $V_C$ constant. Thus, as the input voltage $V_X$ increases, PFC and output voltage controller 114 increases the period TT of control signal $CS_0$, and as the input voltage $V_X$ decreases, PFC and output voltage controller 114 decreases the period TT of control signal $CS_0$. At the same time, the pulse width PW of control signal $CS_0$ is adjusted to maintain a constant duty cycle (D) of control signal $CS_0$, and, thus, hold the output voltage $V_C$ constant. In at least one embodiment, the PFC and output voltage controller 114 updates the control signal $CS_0$ at a frequency much greater than the frequency of input voltage $V_X$. The frequency of input voltage $V_X$ is generally 50-60 Hz. The frequency 1/TT of control signal $CS_0$ is, for example, between 20 kHz and 130 kHz. Frequencies at or above 20 kHz avoid audio frequencies and frequencies at or below 130 kHz avoid significant switching inefficiencies while still maintaining good power factor, e.g. between 0.9 and 1, and an approximately constant output voltage $V_C$.

Referring to FIG. 1, the pulse width of control signal $CS_0$ varies over time. For example, when the power demand of load 112 is low, such as when load 112 is an idle or standby state, PFC and output voltage controller 114 controls the pulse width of control signal $CS_0$ so that some of the pulses of control signal $CS_0$ are very small. When the pulse width of control signal $CS_0$ is small, switch 108 turns ON and OFF quickly causing a short ON time duration. However, turning the switch 108 ON for short durations can create a problem because short switching durations can be very inefficient. The inefficiency occurs because, for example, the ratio of the power required to turn switch 108 ON to the power transferred to load 112 decreases as the ON time of switch 108 decreases.

SUMMARY OF THE INVENTION

In one embodiment of the present invention, an apparatus includes a delta sigma modulator having two ranges of available output values and a range of one or more unavailable intermediate output values. The range of one or more unavailable intermediate output values represent a gap in available output values and represents output values that are unavailable for use in generating a duty cycle modulated control signal to control a switch of a switching power converter. The apparatus also includes a duty cycle modulator, coupled to the delta sigma modulator, to receive the available output values from the delta sigma modulator and to generate the duty cycle modulated control signal to control the switch of the switching power converter.

In another embodiment of the present invention, a method includes generating output values with a delta sigma modulator. The output values of the delta sigma modulator include two ranges of available output values and a range of one or more unavailable intermediate output values. The range of one or more unavailable intermediate output values represents a gap in available output values and represents output values that are unavailable for use in generating a duty cycle modulated control signal to control a switch of a switching power converter. The method also includes generating the duty cycle modulated control signal to control the switch of the switching power converter using the available output values of the delta sigma modulator.

In a further embodiment of the present invention, an apparatus includes means for generating output values with a delta sigma modulator. The output values of the delta sigma modulator include two ranges of available output values and a range of one or more unavailable intermediate output values. The range of one or more unavailable intermediate output values represents a gap in available output values and represents output values that are unavailable for use in generating a duty cycle modulated control signal to control a switch of a switching power converter. The apparatus further includes means for generating the duty cycle modulated control signal to control the switch of the switching power converter using the available output values of the delta sigma modulator.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 depicts a software embodiment of the output remapping-delta-sigma modulator of FIG. 6.

DETAILED DESCRIPTION

At least one embodiment of a power control system includes a delta sigma modulator to generate output values for use in controlling a switching power converter. In at least one embodiment, the delta sigma modulator includes two ranges of available output values and a range of one or more unavailable intermediate output values, wherein the range of one or more unavailable intermediate output values represent a gap in available output values. Each unavailable intermediate output value represents an output value that is not generated by the delta sigma modulator. In at least one embodiment, the delta sigma modulator includes a quantizer output remapping module that remaps quantizer output values within the range of one or more unavailable intermediate output values of the delta sigma modulator to new output values within one of the ranges of available output values. In at least one embodiment, the unavailable output values correspond to pulse widths of the control signal to be avoided by the PFC and output voltage controller. In at least one embodiment, the PFC and output voltage controller avoids certain small control signal pulse widths that result in switching inefficiencies. In at least one embodiment, a duty cycle modulator of the PFC and output voltage controller converts the available output values of the delta sigma modulator into pulse widths of a control signal.

In at least one embodiment, the control signal represents a duty cycle modulated control signal generated by the PFC and output voltage controller. The pulse width of the control signal corresponds to available output values of the delta sigma modulator, and a pulse of the control signal causes a switch in a switching power converter to turn ON and OFF. The pulse width of the control signal determines the ON time of the switch. In at least one embodiment, the remapped delta sigma modulator output values are fed back to the delta sigma modulator, and the delta sigma modulator uses the fed back, remapped output values as the actual output value of the delta sigma modulator. In at least one embodiment, the delta sigma modulator is a conventional delta sigma modulator. In at least one embodiment, the delta sigma modulator is a nonlinear delta sigma modulator that models nonlinear processes, such as a nonlinear energy transfer process of a switching power converter.

In at least one embodiment, the avoided pulse widths of the control signal correspond to inefficient operation of the switch. For example, in at least one embodiment, a range of pulse widths correspond to low power demand by a load connected to the switching power converter. Pulse widths corresponding to low power demand are generally shorter relative to higher power operation. Short pulse widths can result in increasing switching inefficiencies because, for example, more power is used to turn the switch ON and OFF more rapidly while transferring less energy from the switching power converter.

Figure 2:
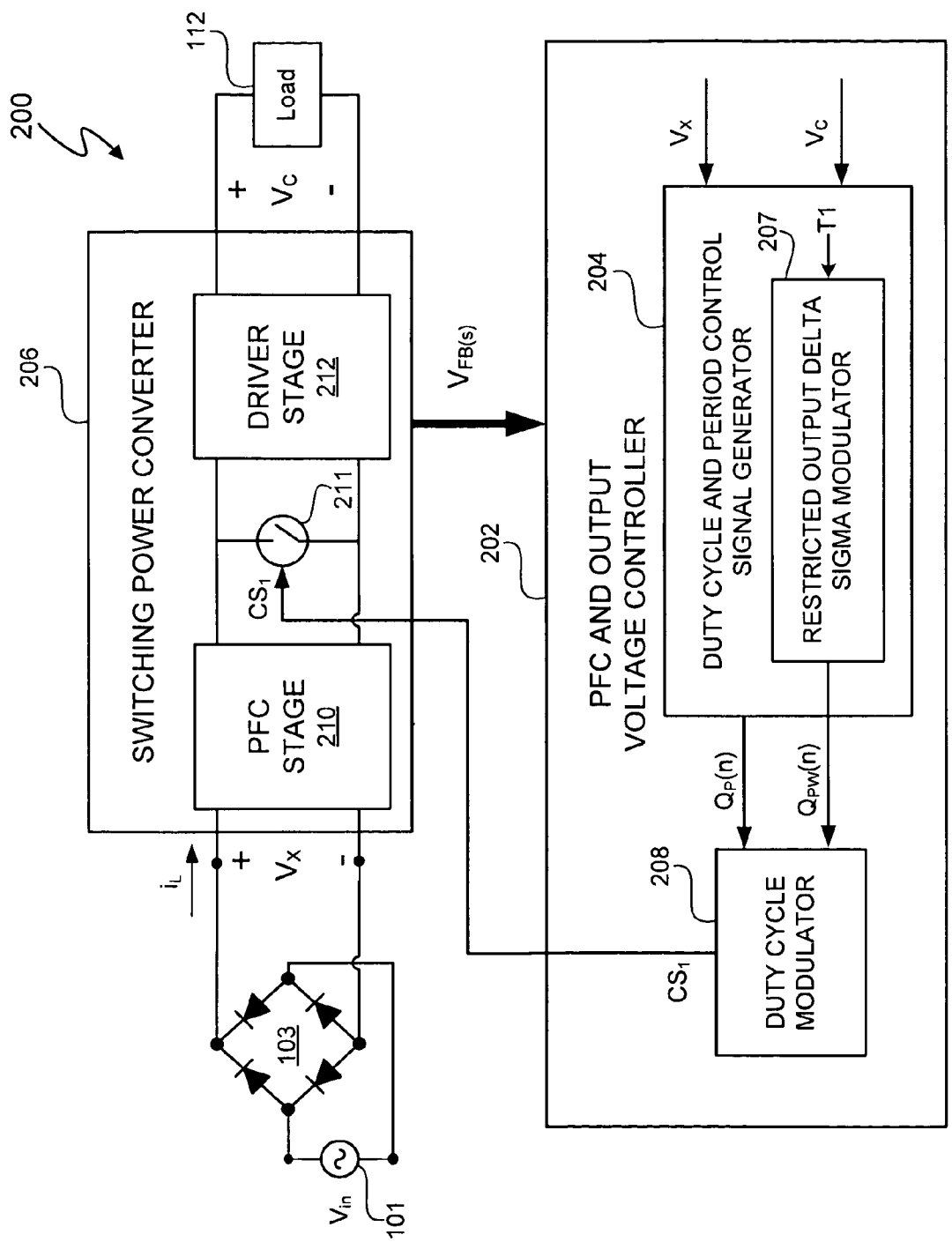
FIG. 2 depicts a power control system that includes PFC and output voltage controller having an output remapping delta sigma modulator module.

FIG. 2 depicts a power control system 200 that includes a PFC and output voltage controller 202. The PFC and output voltage controller 202 includes duty cycle and period control signal generator 204. The PFC and output voltage controller 202 receives a feedback signal $V_{FB(s)}$. In at least one embodiment, the feedback signal $V_{FB(s)}$ represents the rectified input voltage $V_X$ and output voltage $V_C$ of switching power converter 206. The duty cycle and period control signal generator 204 utilizes the input voltage $V_X$ and the output voltage $V_C$ to generate a period control signal $Q_P(n)$ and a pulse width control signal $Q_{PW}(n)$. The duty cycle modulator 208 generates control signal CS1 so that control signal CS1 has a period set in accordance with the period control signal QP(n) and has a pulse width set in accordance with pulse width control signal QPW(n). In at least one embodiment, the duty cycle and period control signal generator 204 generates the period control signal $Q_P(n)$ in accordance with the exemplary description in U.S. patent application Ser. No. 11/967,269, entitled "POWER CONTROL SYSTEM USING A NONLINEAR DELTA-SIGMA MODULATOR WITH NONLINEAR POWER CONVERSION PROCESS MODELING", inventor John Melanson, assignee Cirrus Logic, Inc., and filing date Dec. 31, 2007 (referred to herein as "Melanson I"). Melanson I is hereby incorporated by reference in its entirety. The duty cycle modulator 208 can be any type of duty cycle modulator including a pulse width modulator. The PFC and output voltage controller 202 can be implemented in any of a variety of ways including as an integrated circuit or a combination of discrete components and an integrated circuit.

The duty cycle and period control signal generator 204 includes a restricted output delta sigma modulator 207 to generate the pulse width control signal $Q_{PW}(n)$. The restricted output delta sigma modulator 207 converts input signal T1 into the pulse width control signal $Q_{PW}(n)$. In at least one embodiment, the input signal T1 represents an initial determination of the pulse width of control signal $CS_1$. In at least one embodiment, input signal T1 equals an initial determination of the square of the pulse width of control signal $CS_1$. In at least one embodiment, the input signal T1 is determined as discussed in Melanson I. U.S. patent application Ser. No. 12/047,269, entitled "LIGHTING SYSTEM WITH POWER FACTOR CORRECTION CONTROL DATA DETERMINED FROM A PHASE MODULATED SIGNAL," inventor John L. Melanson, assignee Cirrus Logic, Inc., and filing date Mar. 12, 2008 (referred to herein as "Melanson II") also describes an exemplary determination of input signal T1. Melanson II is also hereby incorporated by reference in its entirety.

In at least one embodiment, the restricted output delta sigma modulator 207 restricts the possible values of the pulse width control signal $Q_{PW}(n)$ so that control signal $CS_1$ avoids certain pulse widths. In at least one embodiment, the control signal represents a duty cycle modulated control signal generated by the PFC and output voltage controller 202. The pulse width of the control signal $CS_1$ corresponds to output values of the restricted output delta sigma modulator 207, and a pulse of the control signal $CS_1$ causes switch 211 in switching power converter 206 to turn ON and OFF. Switch 211 can be any type of switch. In at least one embodiment, switch 211 is the same type of switch as switch 108, such as an n-channel field effect transistor.

The pulse width of the control signal $CS_1$ determines the ON time of the switch 211. In at least one embodiment, the avoided pulse widths of the control signal $CS_1$ correspond to inefficient operation of the switch 211. For example, in at least one embodiment, a range of pulse widths correspond to low power demand by a load 112 connected to the switching power converter 206. Pulse widths of control signal $CS_1$ corresponding to low power demand by load 112 are generally shorter relative to higher power operation. Short pulse widths can result in increasing switching inefficiencies because, for example, more power is used to turn the switch 211 ON and OFF more rapidly while transferring less energy from the switching power converter restricted output delta sigma modulator 207 to load 112. Load 112 can be any type of load including one or more light emitting diode based lighting fixtures.

To improve efficiency, in at least one embodiment, the restricted output delta sigma modulator 207 remaps all quantizer output values that are within an unavailable output range to output values in an available range. By remapping the quantizer output values, the duty cycle and period control signal generator 204 avoids pulse widths corresponding to the quantizer output values in the unavailable output value range.

Figure 3:
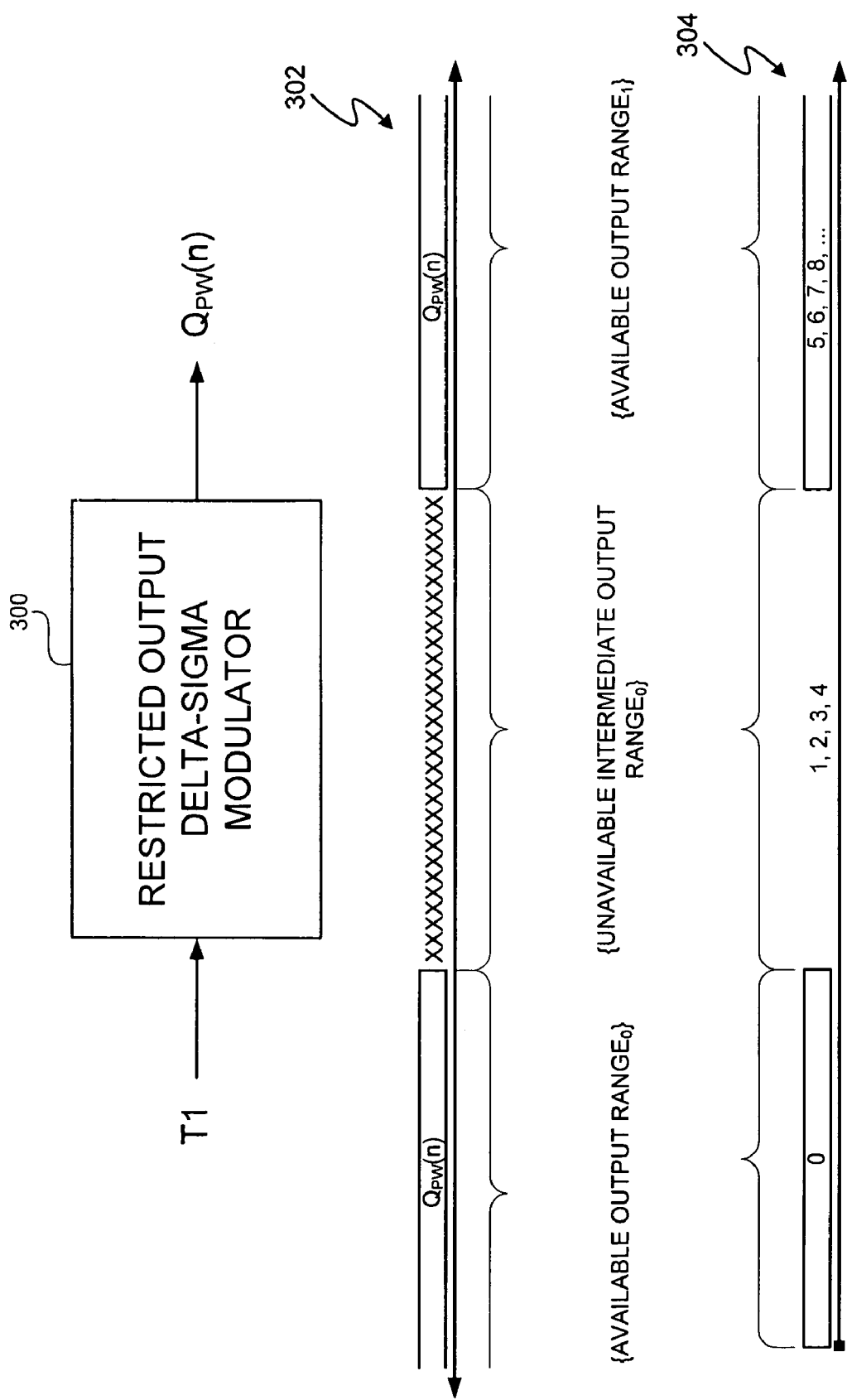
FIG. 3 depicts an embodiment of the output remapping-delta-sigma modulator of FIG. 2.

FIG. 3 depicts restricted output delta sigma modulator 300, which represents one embodiment of restricted output delta sigma modulator 207. The restricted output delta sigma modulator 300 receives the input signal T1, which indicates a pulse width for control signal $CS_1$. The restricted output delta sigma modulator 300 generates output values that form pulse width control signal $Q_{PW}(n)$. The restricted output delta sigma modulator 300 generates output values 302, and the output values 302 include AVAILABLE OUTPUT RANGE$_0$ and AVAILABLE OUTPUT RANGE$_1$. The AVAILABLE OUTPUT RANGE$_0$ and AVAILABLE OUTPUT RANGE$_1$ represent possible values of pulse width control signal $Q_{PW}(n)$. The output values 302 also include an UNAVAILABLE INTERMEDIATE OUTPUT RANGE$_0$. In at least one embodiment, the UNAVAILABLE INTERMEDIATE OUTPUT RANGE$_0$ represents a gap in available output values. The gap represented by the UNAVAILABLE INTERMEDIATE OUTPUT RANGE$_0$ divides the available values into the AVAILABLE OUTPUT RANGE$_0$ and the AVAILABLE OUTPUT RANGE$_1$. The output values 302 can include multiple unavailable intermediate output ranges, which form multiple gaps in available output values. A "range" can be a single value or multiple values. Because the output values in the UNAVAILABLE INTERMEDIATE OUTPUT RANGE$_0$ or in multiple unavailable intermediate output ranges represent a gap in the available output values of the restricted output delta sigma modulator 300, every output value in the UNAVAILABLE INTERMEDIATE OUTPUT RANGE$_0$ or in multiple unavailable intermediate output ranges is greater than at least one available output value and is less than at least one available output value.

Referring to FIGS. 2 and 3, values of pulse width control signal $Q_{PW}(n)$ directly correspond to the pulse width of control signal $CS_1$. In at least one embodiment, the quantizer output values of restricted output delta sigma modulator 207 are identified by discrete identifiers, and "0" indicates a quantizer output value corresponding to a pulse width of zero duration, a quantizer output value of "1" indicates the next smallest pulse width, and so on. If the output values 304 of restricted output delta sigma modulator 300 have an AVAILABLE OUTPUT RANGE$_0$ of {0}, AVAILABLE OUTPUT RANGE$_1$ of {5, 6, 7, ... N}, and an UNAVAILABLE INTERMEDIATE OUTPUT RANGE$_0$ of {1, 2, 3, 4}, then the restricted output delta sigma modulator 207 avoids values of pulse width control signal Q$_{PW}$(n) in the range {1, 2, 3, 4}. "N" represents the last available output value in AVAILABLE OUTPUT RANGE$_1$. In at least one embodiment, restricted output delta sigma modulator 207 remaps output values in the UNAVAILABLE INTERMEDIATE OUTPUT RANGE$_0$ to output values in either AVAILABLE OUTPUT RANGE$_0$ or AVAILABLE OUTPUT RANGE$_1$ so that the control signal CS$_1$ will have a pulse width of 0 or a pulse width of 6. The pulse widths corresponding to output values 304 in the UNAVAILABLE INTERMEDIATE OUTPUT RANGE$_0$ represent short ON times of switch 211, with "1" being the smallest and "5" being the longest. By remapping the UNAVAILABLE INTERMEDIATE OUTPUT RANGE$_0$ of output values 304 to either AVAILABLE OUTPUT RANGE$_0$ or AVAILABLE OUTPUT RANGE$_1$, the short ON times of switch 211 associated with the UNAVAILABLE INTERMEDIATE OUTPUT RANGE$_0$ are eliminated. Thus, the efficiency of switch 211 is improved.

In at least one embodiment, the restricted output delta sigma modulator 207 ensures that the average pulse width of control signal CS$_1$ matches the average pulse width indicated by input signal T1. By maintaining the average pulse width of control signal CS$_1$ as indicated by input signal T1, remapping the unavailable range of output values does not affect the average power output of switching power converter 206.

Figure 1:
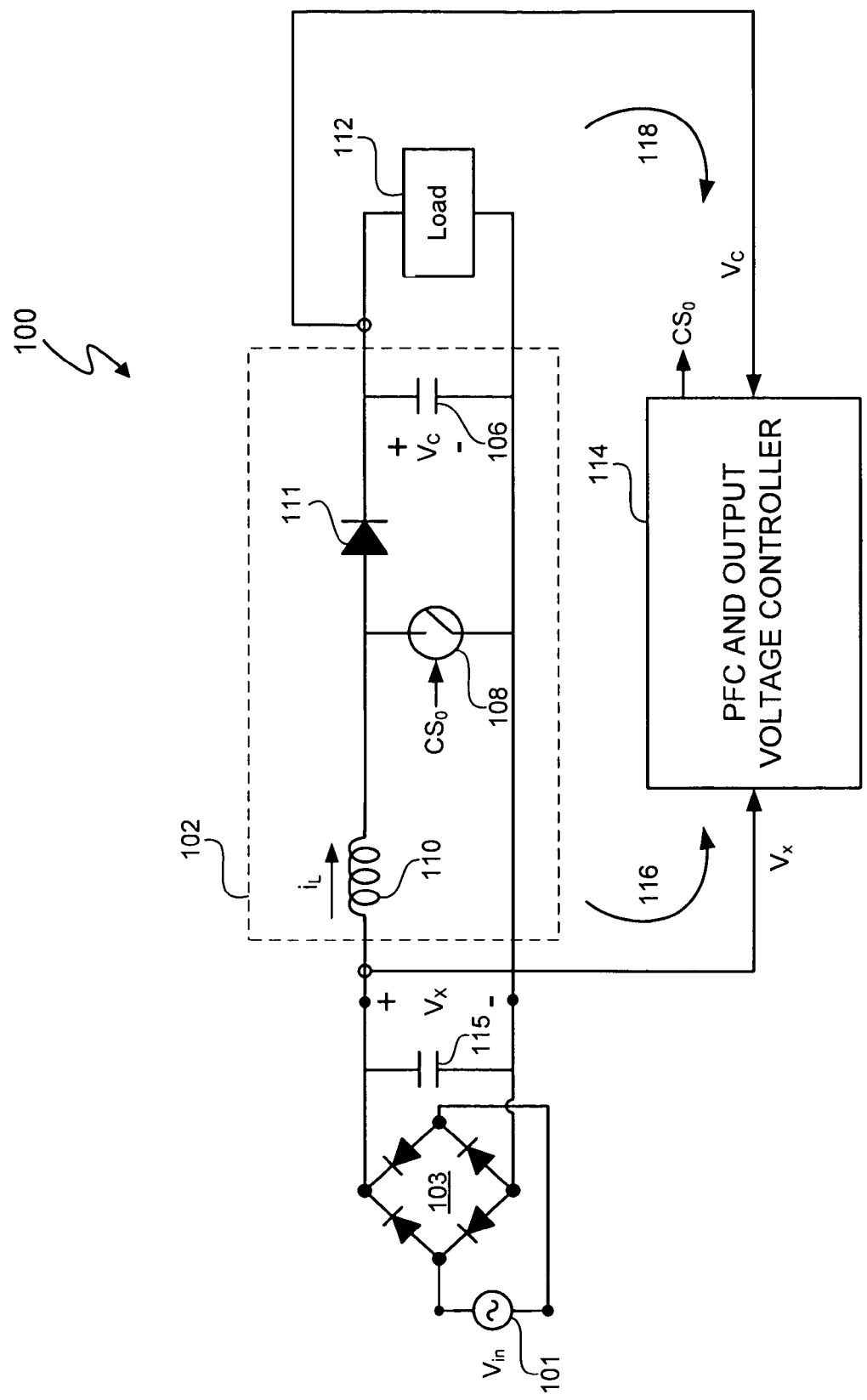
FIG. 1 (labeled prior art) depicts a power control system with a power factor correction and output voltage controller.

The switching power converter 206 can be any type of switching power converter such as a boost, buck, or boost-buck type switching power converter. In at least one embodiment, the switching power converter 206 includes a power factor correction stage 208 and a driver stage 210. The configuration of the power factor correction stage 208 and the driver stage 210 is a matter of design choice and depends upon the switching power converter type. In at least one embodiment, switching power converter 206 is configured identically to switching power converter 102 of FIG. 1.

Figure 4:
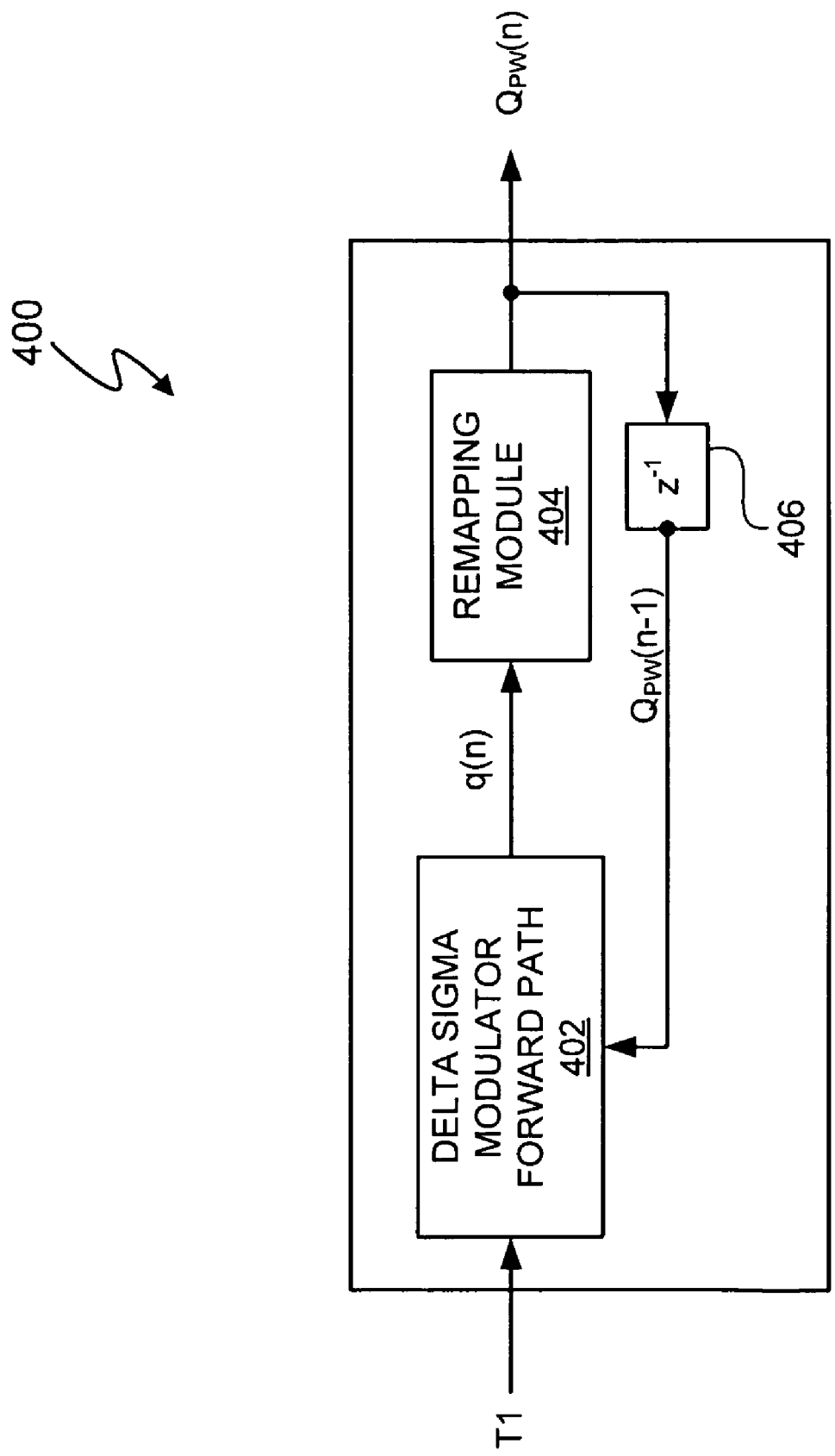
FIG. 4 depicts another embodiment of the output remapping-delta-sigma modulator of FIG. 2.

FIG. 4 depicts output remapping-delta-sigma modulator 400, which represents one embodiment of restricted output delta sigma modulator 207. The output remapping-delta-sigma modulator 400 includes a delta sigma modulator forward path 402 that receives the input signal T1 and generates a quantizer output q(n). The quantizer output q(n) of delta sigma modulator forward path 402 represents the pulse width indicated by input signal T1. In general, for each value of input signal T1, there is one corresponding value of quantizer output q(n). In at least one embodiment, the "quantizer output q(n)" represents a noise shaped, average output of input signal T1. Delta sigma modulator forward path 402 can be any delta sigma modulator forward path. Exemplary conventional delta-sigma modulator design and operation is described in more detail in the book *Understanding Delta-Sigma Data Converters* by Schreier and Temes, IEEE Press, 2005, ISBN 0-471-46585-2. In at least one embodiment, delta sigma modulator 400 is a nonlinear delta sigma modulator, such as the nonlinear delta sigma modulator described in Melanson I with the inclusion of remapping module 404. In at least one embodiment, nonlinear delta sigma modulators include elements to model nonlinear processes, such as a nonlinear energy transfer process in a boost-type switching power converter.

The output remapping-delta-sigma modulator 400 also includes a remapping module 404. The remapping module 404 remaps at least a subset of the values of the quantizer output q(n) to new values. In at least one embodiment, the remapping module 404 determines if the quantizer output q(n) has a value in an unavailable set of values, i.e. the subset of values to be remapped. If the quantizer output q(n) has a first value that is included in the unavailable set, then the remapping module 404 maps the first value to a second value. In at least one embodiment, if the quantizer output q(n) has a value that is not in the unavailable set, then the remapping module 404 does not remap the quantizer output q(n), and the pulse width control signal Q$_{PW}$(n) equals the quantizer output q(n). The values in the unavailable set are a matter of design choice. The values in the unavailable set can be consecutive values, nonconsecutive values, or any set or sets of values. The value or values to which the quantizer output q(n) is remapped (referred to as the "remapped values") are a matter of design choice. In at least one embodiment, the unavailable set of quantizer output q(n) values correspond to pulse widths of control signal CS$_1$ to be avoided, and the remapped values correspond to zero duration pulse width and a pulse width having a duration greater than the longest avoided pulse width.

The output remapping-delta-sigma modulator 400 feeds back the pulse width control signal Q$_{PW}$(n) as if the pulse width control signal Q$_{PW}$(n) was the actual quantizer output q(n). The delay z$^{-1}$ 406 indicates that the previous value of pulse width control signal Q$_{PW}$(n), i.e. pulse width control signal Q$_{PW}$(n−1), represents the quantizer feedback for delta sigma modulator forward path 402. By feeding back the pulse width control signal Q$_{PW}$(n−1), the average value of pulse width control signal Q$_{PW}$(n) equals the average value of input signal T1. Thus, the average power output of switching power converter 206 is unaffected by output remapping-delta-sigma modulator 400.

Figure 5:
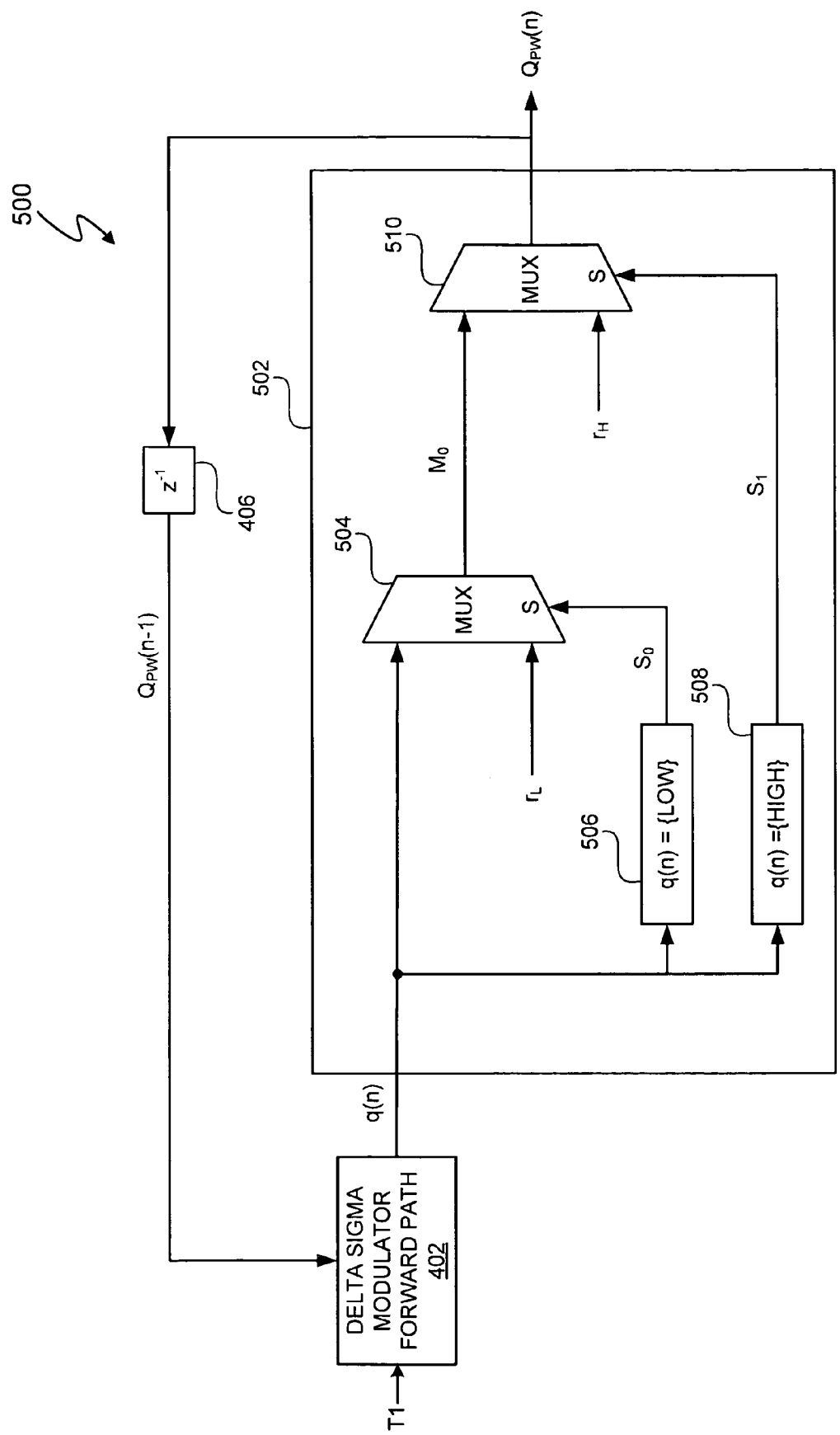
FIG. 5 depicts an embodiment of the output remapping-delta-sigma modulator of FIG. 2.

FIG. 5 depicts output remapping-delta-sigma modulator 500, which represents one embodiment of output remapping-delta-sigma modulator 400. The output remapping-delta-sigma modulator 500 includes a remapping module 502 to remap values of quantizer output q(n) in an unavailable intermediate range to values in one of two available ranges. In at least one embodiment, the unavailable intermediate range is defined by a first unavailable set of values {LOW} and a second unavailable set of values {HIGH}. A first available output range includes a low value r$_L$, and a second available output range includes a high value r$_H$. In at least one embodiment, the low value r$_L$ is lower than all the values in the unavailable intermediate range, and the high value r$_H$ is greater than all the values in the unavailable intermediate range. The output remapping-delta-sigma modulator 500 remaps values of quantizer output q(n) within the first unavailable set {LOW} to the low remapped value r$_L$ so that pulse width control signal Q$_{PW}$(n) equals r$_L$. The remapping module 502 represents one embodiment of remapping module 404. The remapping module 502 remaps values of quantizer output q(n) within the second unavailable set {HIGH} to the high remapped value r$_H$ so that pulse width control signal Q$_{PW}$(n) equals r$_H$. The first unavailable set and the second unavailable set can be conceptually considered as two ranges or as a single range {LOW, HIGH}. If the value of quantizer output q(n) is not in the unavailable intermediate range, then the quantizer output q(n) is not remapped, and pulse width control signal Q$_{PW}$(n) equals quantizer output q(n).

The remapping module 502 feeds the quantizer output q(n) into multiplexer 504 and into value identifiers 506 and 508. If value identifier 506 determines that quantizer output q(n) is a member of the unavailable set {LOW}, then value identifier 506 sends a select signal $S_0$ to a select node S of multiplexer 504 that causes the multiplexer output $M_0$ to equal low remapped value $r_L$. If value identifier 506 determines that quantizer output q(n) is not a member of the unavailable set {LOW}, then value identifier 506 sends a select signal $S_0$ to select node S of multiplexer 504 that causes the multiplexer output $M_0$ to equal the quantizer output q(n). The multiplexer output $M_0$ is fed into an input of multiplexer 510. If value identifier 508 determines that quantizer output q(n) is a member of the unavailable set {HIGH}, then value identifier 508 sends a select signal $S_0$ to a select node S of multiplexer 510 that causes pulse width control signal $Q_{PW}(n)$ to equal low remapped value $r_L$. If value identifier 508 determines that quantizer output q(n) is not a member of the unavailable set {HIGH}, then value identifier 508 sends a select signal $S_0$ to select node S of multiplexer 510 that causes pulse width control signal $Q_{PW}(n)$ to equal the multiplexer output $M_0$.

The particular values of the unavailable set {LOW, HIGH}, low remapped value $r_L$, and high remapped value $r_H$ are a matter of design choice. For the set {LOW} equal {1,3,4}, {HIGH} equal {2}, low remapped value $r_L$ equal 0, and high remapped value $r_H$ equal 1, Table 1 below depicts exemplary values for quantizer output q(n) and pulse width control signal $Q_{PW}(n)$:

TABLE 1

| q(n) | $Q_{PW}(n)$ |
|---|---|
| 1 | 0 |
| 2 | 5 |
| 3 | 0 |
| 4 | 0 |

So, the pulse width control signal $Q_{PW}(n)$ will always be a 0 or a 5. Avoiding pulse widths of 1, 2, 3, and 4 creates a dead zone so that the pulse width of control signal $CS_0$ will either be zero or correspond to a quantizer output value of 5 or more. The dead zone prevents inefficient switching frequencies of switch 211.

In at least one embodiment, the quantizer output q(n) varies by +/−1 or +/−2. Thus, the quantizer output q(n) varies very little from output to output. If the previous value of quantizer output q(n) is 5, then the next value can only be as low as 3. If the previous value of pulse width control signal $Q_{PW}(n-1)=5$, then the next value of pulse width control signal $Q_{PW}(n)$ should be 3, 4, 6, or 7. If the previous value of pulse width control signal $Q_{PW}(n-1)=0$, then the next value of pulse width control signal $Q_{PW}(n)$ should be 1 or 2. Table 2 depicts the current quantizer output q(n), the normal output N, and the remapped output=pulse width control signal $Q_{PW}(n)$:

TABLE 2

| $Q_{PW}(n-1)$ | N | $Q_{PW}(n)$ |
|---|---|---|
| 5 | 4 | 0 |
| 5 | 3 | 0 |
| 5 | 6 or 7 | 6 or 7 |
| 0 | 1 | 0 |
| 0 | 2 | 5 |

In accordance with Table 2, although the pulse width control signal $Q_{PW}(n)$ varies between 0, 5, 6, and 7 when the quantizer output q(n) values in the unavailable set are remapped to 0 and 5, the average value of pulse width control signal $Q_{PW}(n)$ matches the normal value N over time. Since the average pulse width control signal $Q_{PW}(n)$ matches the normal value, the average power of switching power converter 206 is unaffected by remapping. The particular remapping scheme is a matter of design choice.

Figure 6:
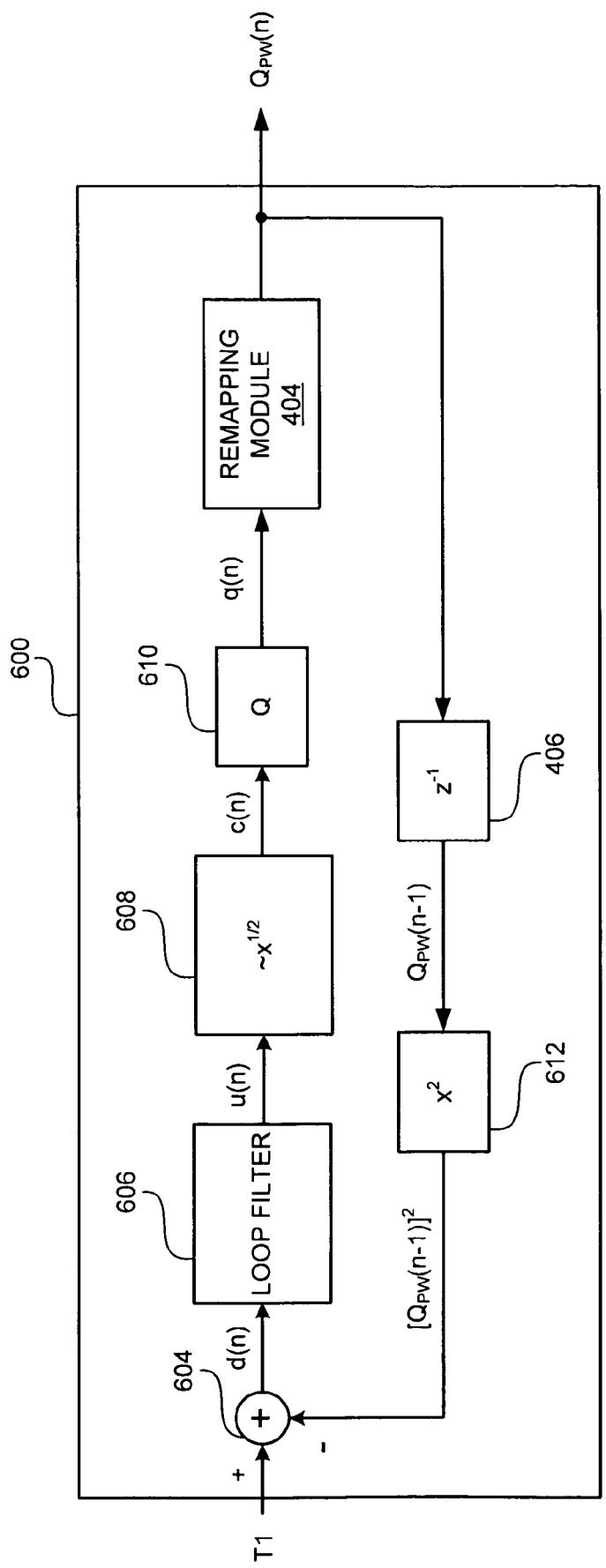
FIG. 6 depicts an embodiment of the output remapping-delta-sigma modulator modules of FIGS. 4 and 5.

FIG. 6 depicts a nonlinear output remapping-delta-sigma modulator 600, which represents an embodiment of output remapping-delta-sigma modulators 400 and 500. The input signal T1 in FIG. 6 represents the square of an initial determination of the ON time for switch 211. Delta sigma modulator 600 includes a summing node 604 that adds input signal T1 and a $[-Q_{PW}(n)]$ to determine a difference signal d(n). Loop filter 606 filters difference signal d(n) to generate loop filter output signal u(n). Nonlinearity compensation module 608 processes output signal u(n) with a square root function $x^{1/2}$. The output c(n) of compensation module 604 is quantized by quantizer 610 to generate quantizer output q(n). The nonlinear energy transfer process of switching power converter 206 can be modeled as a square function, $x^2$. Nonlinear delta-sigma modulator 600 includes a nonlinear system feedback model 612 represented by $x^2$. The output of feedback model 612 is the square of the delay-by-one quantizer output signal $Q_{PW}(n)$, i.e. $[Q_{PW}(n-1)]^2$. Melanson I and Melanson II describe in more detail embodiments of nonlinear delta sigma modulator 600 without remapping module 404.

Table 3 below depicts exemplary values for quantizer output q(n) and pulse width control signal $Q_{PW}(n)$ for nonlinear output remapping-delta-sigma modulator 600 for an unavailable range of output values of {1, 2, 3, 4}:

TABLE 3

| q(n) | $Q_{PW}(n)$ |
|---|---|
| 1 | 0 |
| 2 | 0 |
| 3 | 5 |
| 4 | 5 |

The output remapping-delta-sigma modulator 400 can be implemented in hardware, software, or a combination of hardware and software. FIG. 7 depicts exemplary C++ code 700 to implement output remapping-delta-sigma modulator 600. The code 700 can be stored in a memory and executed by a processor (not shown).

Thus, a power control system includes a delta sigma modulator having two ranges of available output values and a range of one or more unavailable intermediate output values. The range of one or more unavailable intermediate output values represents a gap in available output values. The power control system also includes a duty cycle modulator to receive the available output values from the delta sigma modulator and to generate a duty cycle modulated control signal to control a switch of a switching power converter.

Although the present invention has been described in detail, it should be understood that various changes, substitutions and alterations can be made hereto without departing from the spirit and scope of the invention as defined by the appended claims.

What is claimed is:

1. An apparatus comprising:
   a delta sigma modulator having two ranges of available output values and a range of one or more unavailable intermediate output values, wherein the range of one or more unavailable intermediate output values represent a gap in available output values and represents output values that are unavailable for use in generating a duty cycle modulated control signal to control a switch of a switching power converter; and a duty cycle modulator, coupled to the delta sigma modulator, to receive the available output values from the delta sigma modulator and to generate the duty cycle modulated control signal to control the switch of the switching power converter.

2. The apparatus of claim 1 wherein the delta sigma modulator comprises:
a quantizer to generate quantizer output values; and
a remapping module to receive the quantizer output values and to remap quantizer output values having values in the range of unavailable intermediate output values to output values in at least one of the available output value ranges.

3. The apparatus of claim 2 wherein the delta sigma modulator includes a quantizer and the remapping module is further configured to provide remapped quantizer output values as quantizer feedback values.

4. The apparatus of claim 1 wherein each of the one or more unavailable intermediate output values is greater than each available output value in a first of the two ranges of available output values and each of the one or more unavailable intermediate output values is less than each available output value in a second of the two ranges of available output values.

5. The apparatus of claim 1 wherein the range of unavailable intermediate output values corresponds to a zero power zone for the switching power converter.

6. The apparatus of claim 5 wherein the zero power zone is a zone ranging from zero power to a power level that is less than fifty percent of a maximum output power of the switching power converter.

7. The apparatus of claim 1 wherein the delta sigma modulator includes multiple ranges of unavailable intermediate output values.

8. The apparatus of claim 1 wherein the range of unavailable intermediate output values correspond to a range of power output levels of the switching power converter.

9. The apparatus of claim 8 wherein the range of power output levels is from approximately zero power to less than or equal to approximately ten percent of maximum output power of the switching power converter.

10. The apparatus of claim 1 wherein the switching power converter is selected from a group consisting of a boost converter, a buck converter, and a boost/buck converter.

11. The apparatus of claim 1 wherein the delta sigma modulator is a nonlinear delta sigma modulator.

12. The apparatus of claim 1 wherein one of the ranges of available output values consists of a single output value, and the single output value is less than each of the one or more unavailable intermediate output values.

13. A method comprising:
generating output values with a delta sigma modulator, wherein (i) the output values of the delta sigma modulator include two ranges of available output values and a range of one or more unavailable intermediate output values and (ii) the range of one or more unavailable intermediate output values represents a gap in available output values and represents output values that are unavailable for use in generating a duty cycle modulated control signal to control a switch of a switching power converter; and
generating the duty cycle modulated control signal to control the switch of the switching power converter using the available output values of the delta sigma modulator.

14. The method of claim 13 wherein generating output values with a delta sigma modulator further comprises:
generating quantizer output values;
receiving the quantizer output values;
remapping quantizer output values having values in the range of unavailable intermediate output values to output values in at least one of the available output value ranges.

15. The method of claim 14 further comprising:
providing remapped quantizer output values as quantizer feedback values to the delta sigma modulator.

16. The method of claim 13 wherein each of the one or more unavailable intermediate output values is greater than each available output value in a first of the two ranges of available output values and each of the one or more unavailable intermediate output values is less than each available output value in a second of the two ranges of available output values.

17. The method of claim 13 wherein the range of unavailable intermediate output values corresponds to a zero power zone for the switching power converter.

18. The method of claim 17 wherein the zero power zone is a zone ranging from zero power to a power level that is less than fifty percent of a maximum output power of the switching power converter.

19. The method of claim 13 wherein the delta sigma modulator includes multiple ranges of unavailable intermediate output values.

20. The method of claim 13 wherein the range of unavailable intermediate output values correspond to a range of power output levels of the switching power converter.

21. The method of claim 20 wherein the range of power output levels is from approximately zero power to less than or equal to approximately ten percent of maximum output power of the switching power converter.

22. The method of claim 13 wherein the switching power converter is selected from a group consisting of a boost converter, buck converter, and boost/buck converter.

23. The method of claim 13 wherein the delta sigma modulator is a nonlinear delta sigma modulator.

24. The method of claim 13 wherein one of the ranges of available output values consists of a single output value, and the single output value is less than each of the one or more unavailable intermediate output values.

25. An apparatus comprising:
means for generating output values with a delta sigma modulator, wherein the output values of the delta sigma modulator include two ranges of available output values and a range of one or more unavailable intermediate output values, wherein the range of one or more unavailable intermediate output values represents a gap in available output values and represents output values that are unavailable for use in generating a duty cycle modulated control signal to control a switch of a switching power converter; and
means for generating the duty cycle modulated control signal to control the switch of the switching power converter using the available output values of the delta sigma modulator.

* * * * *